US008666194B2

(12) United States Patent
Intwala

(10) Patent No.: US 8,666,194 B2
(45) Date of Patent: Mar. 4, 2014

(54) SYSTEM AND METHOD FOR EDITING FREQUENCY CONTENT OF IMAGES

(75) Inventor: Chintan Intwala, Santa Clara, CA (US)

(73) Assignee: Adobe Systems Incorporated, San Jose, CA (US)

(*) Notice: Subject to any disclaimer, the term of this patent is extended or adjusted under 35 U.S.C. 154(b) by 739 days.

(21) Appl. No.: 12/550,234

(22) Filed: Aug. 28, 2009

(65) Prior Publication Data

US 2013/0121614 A1 May 16, 2013

(51) Int. Cl.
*G06K 9/36* (2006.01)
(52) U.S. Cl.
USPC .......................................................... 382/280
(58) Field of Classification Search
None
See application file for complete search history.

(56) References Cited

U.S. PATENT DOCUMENTS

| | | | |
|---|---|---|---|
| 5,524,290 A | 6/1996 | Ecklund et al. | |
| 6,118,902 A | 9/2000 | Knowles | |
| 6,151,415 A | 11/2000 | Acharya et al. | |
| 6,317,117 B1 | 11/2001 | Goff | |
| 6,377,280 B1 | 4/2002 | Acharya et al. | |
| 2009/0003723 A1* | 1/2009 | Kokemohr | 382/261 |

OTHER PUBLICATIONS

Misiti et al. "Wavelet Toolbox for use in MATLAB". The MathWorks, Inc. Mar. 1996.*
http://en.wikipedia.org/wiki/Wavelet_transform, Accessed: Mar. 15, 2013.*

* cited by examiner

*Primary Examiner* — Claire X Wang
*Assistant Examiner* — Thomas A James
(74) *Attorney, Agent, or Firm* — Wolfe-SBMC

(57) ABSTRACT

Systems, methods, and computer-readable storage media for editing the frequency content of an image may provide an intuitive interface for examining and/or modifying the frequency content. The methods may include accessing image data, performing a wavelet transform of the image data (or another MRA technique) to produce a time-frequency representation (TFR) of the image representing frequency content in multiple frequency bands, and displaying an indication of the frequency content of the image by displaying a sub-image of the TFR or numerical data representing the frequency content at selected pixels. In response to receiving input specifying a desired frequency content modification, the methods may include performing a Fourier transform of the image data to produce frequency content data, modifying the frequency content data, and performing an inverse transformation of the modified data to produce modified image data. The modification may be applied globally or to a selected portion of the image.

20 Claims, 13 Drawing Sheets

SYSTEM AND METHOD FOR EDITING FREQUENCY CONTENT OF IMAGES

BACKGROUND

Description of the Related Art

Graphic applications include an ever-increasing number of image editing features, such as various pre-defined filtering options and resizing operations (e.g., for cropping, expanding, or reducing an image). Examples of pre-defined filtering options include sharpening or blurring operations. These filters are typically based on the same underlying principle, i.e. manipulation of the frequency content of the target image. In the early days of computers, computing the frequency content or Fourier Transform (FT) of the image, and computing the inverse transform were very expensive. Therefore, image editing programs typically implemented filters (e.g., blur, sharpen, etc.) in the spatial domain (e.g., using convolution) in order to improve performance. However, the results are never exact, as there are engineering compromises made to make such spatial filters fast.

Preset filters, such as those implemented in the spatial domain, are sufficient to meet the needs of most users who do not know much about image processing. However, they are not sufficient to satisfy power users who would like to have a full control over the range of manipulations possible in the frequency domain (such as might be useful in scientific image-processing tools meant for engineers and/or mathematicians). In addition, typical implementations of filters in the spatial and/or time domain are directed to local operations, unlike true Fourier Transforms (which are global in scope).

Though the mathematics underlying frequency domain manipulations may be well-understood, current image editing applications do not provide users with a way to access or manipulate the frequency content of an image. Furthermore, a typical user would not have an intuitive understanding of the effect of such manipulations.

SUMMARY

Systems, methods, and computer-readable storage media for editing the frequency content of an image may in some embodiments provide an intuitive interface for examining and/or modifying the frequency content of an image within a seamless workflow. The system and methods described herein may be utilized in image editing applications for sophisticated users, including scientists, engineers, and mathematicians, who desire more control over frequency editing operations (including various filtering operations) and better accuracy than that provided by current image editing applications.

In some embodiments, the methods described herein may include accessing data representing an image, performing a transformation of the data to produce a time-frequency representation of the image with respect to two or more frequency bands, and displaying an indication of at least a portion of the time-frequency representation of the image (e.g., a sub-image of the time-frequency representation or numerical data indicative of the frequency content as computed by the transformation). In some embodiments, the time-frequency representation may include frequency content information for at least three frequency bands (e.g., at least a low-frequency band, a mid-frequency band, and a high-frequency band). In other embodiments, frequency content information may be computed for any number of frequency bands, including a default number of frequency bands, or a user-specified number of frequency bands. In various embodiments, the transformation may include a wavelet transform or another multi-resolution analysis technique in which each sub-image of a time-frequency representation generated by the transform corresponds to a fixed, non-overlapping region (i.e. a slice) of the frequency spectrum of the image.

In some embodiments, displaying an indication of the time-frequency representation of the image may include displaying a graphical image representing the frequency content of the image in at least one of the frequency bands. In other embodiments, displaying an indication of the time-frequency representation of the image may include displaying data representing the frequency content in at least one of the frequency bands at a selected pixel (e.g., a pixel identified by the user through an input mechanism of a graphical user interface of the image editing application). In some embodiments, the methods described herein may include storing data representing the frequency content of the image in a data structure in memory (e.g., a lookup table). In such embodiments, displaying an indication of the time-frequency representation of the image may include displaying at least a portion of the stored data.

In some embodiments, the methods may include receiving user input specifying a desired modification of the frequency content of the image (e.g., an increase in the frequency content in at least one of the frequency bands, a decrease in the frequency content in at least one of the frequency bands, or the application of a standard or custom filtering operation). In some embodiments, the method may include modifying the data representing the image to produce data representing a modified image exhibiting the desired modification of the frequency content. For example, the methods may include performing a transformation on the image data to produce data representing the frequency content of the image, modifying the data representing the frequency content of the image, and performing an inverse transformation of the modified data to produce the data representing the modified image. In some embodiments, the transformation may include a Fourier transform. In other embodiments, the transformation may include a wavelet transform or another multi-resolution analysis technique in which each sub-image generated by the transform corresponds to a fixed, non-overlapping region of the frequency spectrum of the image. In various embodiments, the modification may be applied globally (e.g., to the entire image), or may be applied locally (e.g., in a selected region of the image or in an area defined by a pre-determined radius of influence surrounding an identified pixel).

In various embodiments, data representing the modified image may be stored for subsequent analysis, additional editing, and/or other uses. The methods described herein may in some embodiments be applied in an iterative manner within the image editing application environment until a desired result is achieved.

The methods described herein may be implemented as program instructions, (e.g., stored on computer-readable storage media) executable by a CPU and/or GPU, in various embodiments. For example, they may be implemented as program instructions that, when executed, implement generation of a time-frequency representation of an image and/or frequency content editing, in different embodiments.

Figure 1:
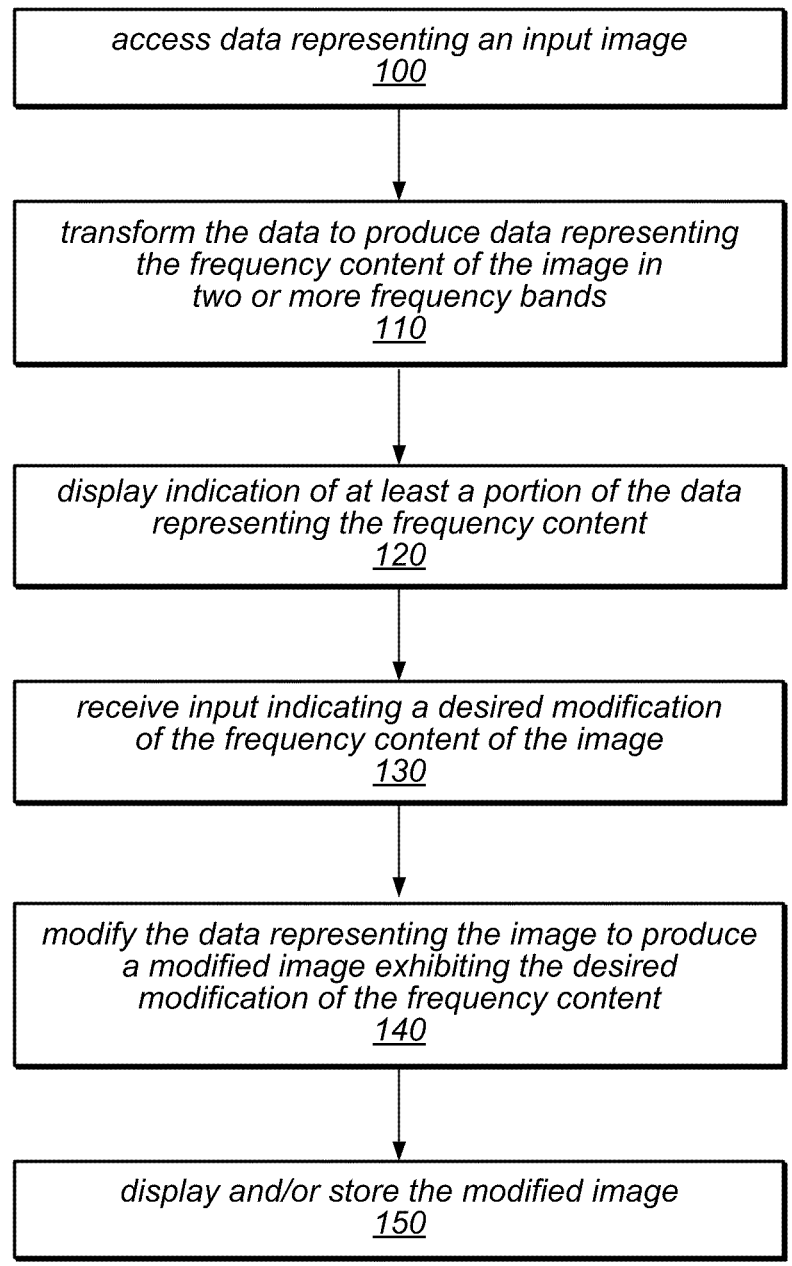
FIG. 1 is a flow diagram illustrating a method for editing the frequency content of an image, according to various embodiments.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follows are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The system and methods described herein may in some embodiments allow users to perform frequency based image processing within an image editing application or an image editing module of another graphics application. The system may provide tools that are intuitive to use and that assist the user in thinking about images in terms of frequency. For example, the tools may allow the user to understand the frequency content at a particular location within an image and to modify the frequency content to achieve a desired change in the image.

The process of manipulating the frequency content of an image typically includes the following operations:
1) Given an image 's', compute its Fourier Transform 'S'
2) Manipulate 'S' accordingly, and call it 'S_t'
3) Compute the inverse transform of S_t to obtain the manipulated image 's_t'

As previously noted, spatial filters (e.g., blur, sharpen, etc.) were developed for image editing applications to address the issue that computing transforms and inverse transforms were expensive operations on existing computers of that time. However, with many modern computers, the computation of Fourier Transforms may be sufficiently fast enough that these transforms (and/or inverse transforms) may be introduced in user workflows to allow users to choose whatever filters they want to apply to the image. In some embodiments, the system described herein may provide an image editing application that includes, instead of menu items for applying various pre-defined blurs or sharpens, an option to apply an operation to "Edit Frequency Content", in which all possible linear-shift-invariant (LSI) filters may be provided, e.g., in addition to (or instead of) those provided as preset filters.

In some ways, manipulating the frequency content of an image may be thought of as being like changing the frequency content of an audio signal (e.g., music). A user may be familiar with the equalizer setting of various music programs, such that it seems intuitive to use it. The user may also be aware of the effect of a given manipulation of the equalizer on the perceived music. However, with image editing, the frequency editing problem may seem much more daunting, for reasons including the following:
1) Unlike a transform applied to music, the Fourier transform of an image is 2-dimensional (2D).
2) Spatial frequency can be hard to see without accurate control, since 2D frequencies have direction/orientation as well.
3) Frequency manipulation using Fourier Transforms is a global operation. Therefore, it may be difficult to support the local (or selection based) image editing that users are accustomed to.

For the typical user, it may be much harder to understand the frequency domain of the image. Thinking in terms of the frequency domain may not be as intuitive to users as thinking in terms of other representations, such as the color domain (e.g., RGB values). The systems and methods described herein may provide mechanisms for frequency manipulation of images that are user friendly, i.e. that users are able to understand intuitively or with very little training.

The system and methods described herein may in some embodiments provide the following:
1) An intuitive visualization tool to examine the "local" frequency content of a region. This tool may also work in a "global" mode.
2) An editor that can directly utilize the information captured by the local examination tool, thereby making the workflow seamless.

Fourier Transforms, as used in electrical engineering and image processing, are considered de-facto standard to perform frequency manipulations. Note that the Fourier Transform of a 2D image is 2D as well. However, analyzing 2D images to edit 2D images may be seen as overkill. In addition, Fourier Transforms are global operations. In other words, the entire image is used to compute the Fourier Transform. Therefore, they cannot be used to answer the question, "What is the frequency content in this region of the image?" In order to "localize" the Fourier transform, typical applications may apply an engineering approximation, i.e. to simply define a reasonably sized window around a point of interest and compute its Fourier transform. This technique is typically used in displaying the "spectrum" of music (e.g., in various music playing applications). However, a major shortcoming of this technique is that it does not give accurate information. The results may depend heavily on the size of the window used. For example, a low frequency that appears in the entire image may be completely missed while analyzing the data in the window.

The systems and methods described herein may provide a better way of visualizing frequency content that does not utilize Fourier Transforms, but uses wavelet transforms instead. A wavelet transform may be used in multi-resolution analysis (MRA). A wavelet transform, or discrete wavelet transform (DWT) as it applies to discrete signals like images, is localized in both frequency and time. The results of the transform are very useful. In applying DWT, high-pass filters are applied to a given signal, dividing it into two half spectra, and then the filters are recursively applied to the lower-frequency half in successive iterations. The result is a collection of sub-signals (or images) representing various slices of the frequency spectrum. In some embodiments, each slice of the spectrum may produce an image (i.e. an image in the true sense as space is still preserved in this spectral slice) that provides local information about any pixel location in the corresponding region of the original image.

Since the wavelet transform is based on Fourier transform theory, it may in some embodiments serve as a reasonable approximation of a Fourier transform for the purposes of generating a frequency domain representation of an image that includes local information. In other words, in some embodiments, DWT may be used to generate a set of images (e.g., sub-images of a time-frequency representation of an image) that represent the projection of the original signal in various frequency ranges and/or directions. In such embodiments, these projections are images themselves which are localized in space. As a result, the system and methods described herein may provide a mechanism for examining local-frequency content.

Note that for digital images, the frequency range is from $0$-$\pi$. As described above, DWT may produce a time-frequency representation of a given image that includes frequency content information for different spectral slices. As described above, each successive application of filters may divide the lower-frequency slice of the previous iteration into two more slices. For example, the highest-frequency slice may in some embodiments always correspond to the range $\pi/2$-$\pi$, the second highest-frequency slice may correspond to the range $\pi/4$-$\pi/2$, the third highest-frequency slice may correspond to the range $\pi/8$-$\pi/4$, and so on, slicing the frequency domain into logarithmically smaller bands, such that the lowest frequency band has a lower boundary of zero. Dividing the frequency domain into logarithmically smaller bands may in some embodiments produce sub-images of the time-frequency representation in each band that may be easier for the human eye to distinguish than if the sub-images reflected the frequency content in frequency bands that each included an equal portion of the frequency spectrum (i.e. where the frequency spectrum is divided linearly). Since the human eye tends to detect low frequency information first, then more detail, the sub-image of the time-frequency representation corresponding to the lowest-frequency slice may appear to be the most similar to the original (input) image. However, upon closer examination, it would be apparent that much of the detail is missing. The system and methods described herein may apply DWT, as described above, to produce a time-frequency representation of a given image, sub-images of which may be displayed graphically (e.g., as images themselves), in some embodiments. In other embodiments, frequency content information computed by DWT may be presented numerically, e.g., for a selected pixel of the image. Such representations may allow a user to visualize the frequency content of an image, providing a intuitive basis for the application of a frequency content editing operation to the image, as described herein.

One method for editing the frequency content of an image is illustrated in FIG. 1, according to various embodiments. As illustrated in this example, the method may include accessing data representing an input image, as in 100. For example, the data representing an input image may be accessed in response to selection of an input image on which to perform an image editing operation, which may include a frequency content editing operation, in some embodiments. This data may be accessed in response to being imported into an application configured for image editing, or may be resident in memory accessible to such an application as a result of being imported previously, or as a result of being created and/or modified by the application prior to invocation of the desired image editing operation. Note that, as used herein, the term "image editing application" may refer to a graphic application that is specifically directed to image editing, or to any application that includes an image editing component, according to various embodiments. The data accessed may represent a whole image or a portion of an image that is to be modified, in different embodiments. For example, in one embodiment, a user may select a portion of an image on which to perform an editing operation (e.g., a frequency content editing operation) using a selecting tool or a cropping tool of an image editing application.

As illustrated in 110 of FIG. 1, the method may include performing a transformation of the data to produce data representing the frequency content of the image in two or more frequency bands. For example, a wavelet transform or another similar transform may be applied to the data representing the input image to generate a time-frequency representation of the image. In some embodiments, such a transformation is performed in response to receiving user input specifying (or invoking) a frequency content editing operation on the image. For example, a user may select a frequency content editing operation to be performed on an input image using various user interface elements of an image editing application (e.g., pull-down menus, radio buttons, or alphanumeric input fields), in various embodiments.

Figure 2:
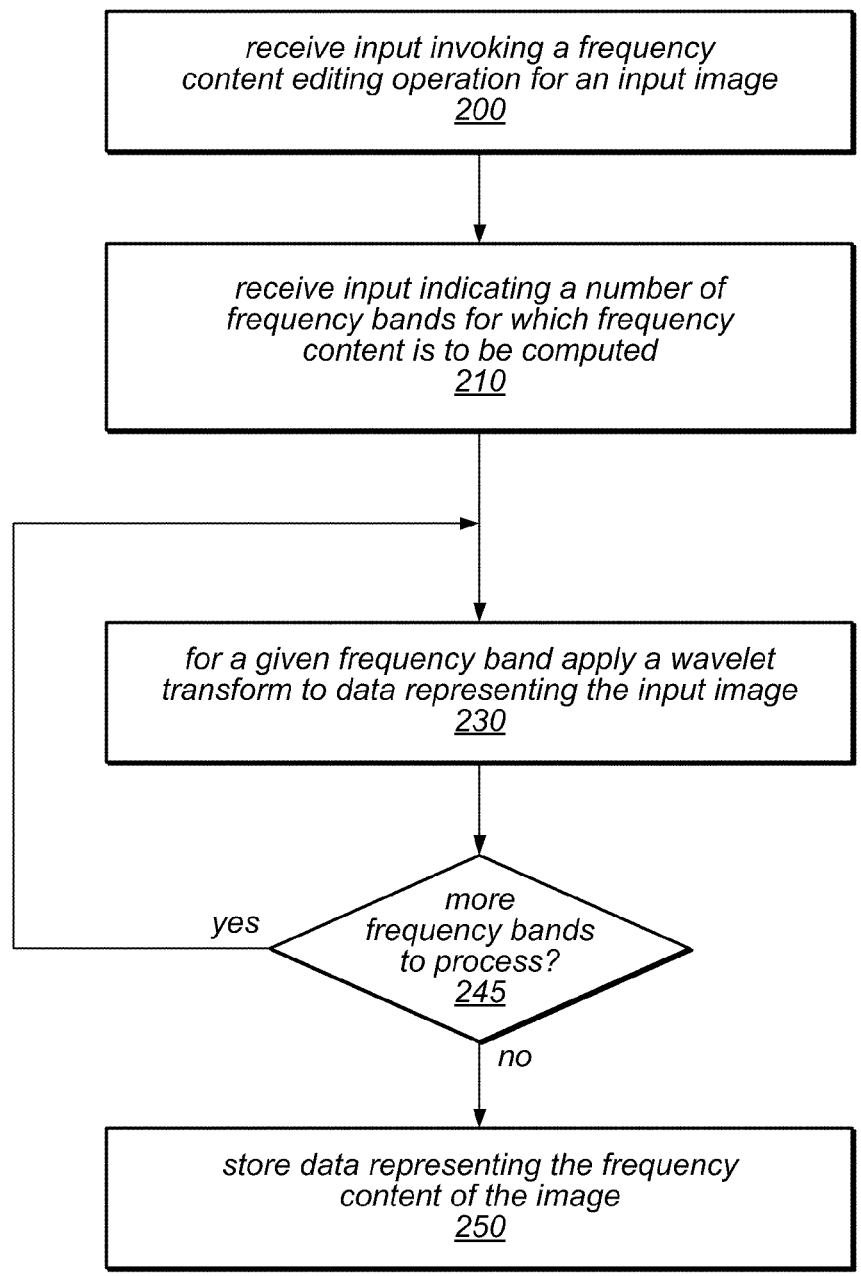
FIG. 2 is a flow diagram illustrating a method for generating data representing the frequency content of an image, according to various embodiments.

In some embodiments, the time-frequency representation generated may be dependent on input received from a user. For example, a user may provide input specifying the number of frequency bands for which to compute the frequency content of the input (e.g., a low-frequency band, a mid-frequency band, and a high-frequency band). In other embodiments, this and other parameters may be defined as default, application-specific, operation-specific parameters. One method for generating data representing the frequency content of an image is illustrated in FIG. 2 and described in more detail below.

As illustrated in 120 of FIG. 1, the method may include displaying an indication of at least a portion of the data representing the frequency content of the image. In some embodiments, the method may include receiving user input identifying a pixel of the image, and displaying data representing the frequency content in at least one of the frequency bands with respect to the identified pixel. For example, in one embodiment, data representing a tuple associated with the pixel may be displayed such that each element of the tuple represents the frequency content at the identified pixel in one of three defined frequency bands (i.e. a low-frequency band, a mid-frequency band, and a high-frequency band). In such embodiments, any type of numerical representation may be used for each element of the tuple (e.g., a range of values from 0-100, or 0-1), or a graphical representation may be used to display data indicating the frequency content of the image. In one embodiment, the values to be displayed (e.g., numerically or graphically) may be obtained by accessing a lookup table generated when the time-frequency representation of the image was generated, as described above. In other words, such data may be generated and stored for subsequent use (e.g., for display and/or for subsequent processing) by the image editing application.

In another example, displaying an indication of at least a portion of the data representing the frequency content of the image may include displaying a graphical image representing the frequency content in at least one of the two or more frequency bands. In some such embodiments, a time-frequency representation of the input image (or a sub-image thereof) may be displayed for each frequency band for which the frequency content has been computed. In one example, each pixel value in the time-frequency representation (or in a sub-image of the time-frequency representation) may correspond to a normalized value of the frequency content at that pixel for the associated frequency band. For example, a white pixel in a graphical image depicting the frequency content of the input image may represent an image pixel associated with a frequency content value of 100 or 100% (i.e. a maximum value) for this frequency band, a black pixel in the graphical image may represent an image pixel associated with a frequency content value of 0, and pixels of various intensities between white and black may represent image pixels associated with frequency content values between 0 and 100. Examples of such graphical representations are illustrated in FIGS. 3B-3H and 4B-4D, and described in detail below.

As illustrated in 130 of FIG. 1, the method may include receiving user input specifying a desired modification of the frequency content of the image. For example, the method may include receiving user input specifying that the high-frequency content of the image should be attenuated, that the low-frequency content of the image should be amplified, or that the frequency content in a particular frequency band should be turned on or off (i.e. included or excluded from the image). In some embodiments, such input may be received through a graphical user interface (GUI) of the image editing application, as described in more detail below.

As illustrated in 140 of FIG. 1, the method may include modifying the data representing the image to produce a modified image exhibiting the desired modification of the frequency content. In some embodiments, the modification may be applied to the results of the wavelet transform itself (e.g., to the time-frequency representation), or to a representation produced using another MRA technique, and the modified image may be generated by an inverse transformation. In other embodiments, such a modification may be made to a Fourier transform of the original image data, rather than on the time-frequency representation generated for examining the frequency content of the image. For example, modifying the data representing the image may include: performing a Fourier transform on the image data to generate data representing the frequency content of the image, modifying this data, and performing an inverse Fourier transform on the modified data to produce a modified image.

In some embodiments, the specified modification may be applied globally to the image. In other embodiments, a specified modification may be applied locally to the image dependent on an identified pixel and a predetermined radius of influence (e.g., where the radius of influence may be specified by input receiving from a user). In still other embodiments, a specified modification may be applied to a portion of the image identified by a user (e.g., to a portion of the image selected by the user using a selection tool of a graphical user interface). As noted above, the modification applied to the image may include increasing the frequency content in at least one of the two or more frequency bands, or decreasing the frequency content in at least one of the two or more bands, in various embodiments. In some embodiments, applying the modification to the image may produce an output image that is similar (or identical) to an output image produced by the application of a standard or custom filter operation to the input image.

As illustrated in 150 of FIG. 1, the method may include storing data representing the modified image for subsequent display and/or further processing. For example, such data may be stored in system memory accessible by the image editing application or another graphics application (e.g., in a table or other data structure configured to store data representing frequency content information for an image). In some embodiments, the data representing the modified image may be provided to a display component of the application for display of the modified image to the user and/or the data may be stored as in intermediate image by the image editing application for further processing by the application (or another application) or as a final image (e.g., written to main memory, a file, an archive, etc.). Note that in some embodiments, modifying the frequency content of an image may be performed in an iterative manner (e.g., applying two or more frequency content editing operations in series, and/or by discarding the results of a frequency content editing operation and performing another frequency content editing operation) until a desirable result is achieved (not shown).

One method for generating data representing the frequency content of an image is illustrated in FIG. 2, according to various embodiments. As illustrated in this example, the method may include receiving input invoking a frequency content editing operation on an input image, as in 200. For example, in some embodiments, frequency content information may be generated in response to receiving user input (e.g., through a GUI) requesting that such data be displayed, or that the user wishes to enter a "frequency content editing mode."

As illustrated in 210 of FIG. 2, the method may include receiving input (e.g., through a GUI) indicating a number of frequency bands for which the frequency content is to be computed. In some embodiments, the user may be able to select any number of frequency bands for which the frequency content is to be computed. In other embodiments, the user may only be able to select a number of frequency bands in a given range. For example, since the human eye may not be able to distinguish the frequency content in a large number of bands (e.g., more than 7 or 8), the user may be restricted to selection of no more than 8 frequency bands in applications in which an image modified by editing the frequency content is to be displayed to the user. In some embodiments, the user may be limited as to the minimum number of frequency bands for which the frequency content is to be computed. For example, the minimum number of frequency bands may be limited to 3 (e.g., a low-frequency band, a mid-range frequency band, and a high-frequency band). In still other embodiments, the number of frequency bands for which the frequency content is to be computed may comprise a default value, an application-specific value, an operation-specific value, or another stored or pre-determined value.

As illustrated in 230 of FIG. 2, the method may include, for a given frequency band, applying a wavelet transformation to data representing the input image. If there are more frequency bands for which the frequency content is to be computed (shown as the positive exit from 245), the method may include performing one or more wavelet transformations for one or more other frequency bands. This is shown in FIG. 3 as the feedback from 245 to 230.

Once all of the desired frequency content computations have been performed, shown as the negative exit from 245, the method may include storing the data representing the frequency content in each of the bands for later use (e.g., in a lookup table or other data structure in system memory and/or as image data for a time-frequency representation), as in 250. In some embodiments, the stored data may be accessed and displayed graphically, as described herein. In other embodiments, the stored data may be accessed and used in subsequent frequency content editing operations or display operations, e.g., using a look-up of frequency content values associated with an identified pixel, as described herein. In some embodiments, rather than storing all of the data representing the frequency content of an image after all of the data has been computed, the method may instead include storing data representing the frequency content of the image for each frequency band as the data is computed. In still other embodiments, the data may be computed on an as-needed basis in response to the invocation of a specific frequency content editing operation.

As noted above, while in several examples described herein, a wavelet transform or DWT is used to produce a time-frequency representation of an image (e.g., for understanding and/or visualization), in other embodiments, the system may utilize transforms other than DWT. For example, in some embodiments, frequency content information, which may include a time-frequency representation, may be generated using Laplacian pyramids, or using any class of Multi-Resolution Analysis (MRA) techniques in which each sub-image generated (e.g., each slice of a time-frequency representation generated by the transform) corresponds to a fixed, non-overlapping region of the frequency spectrum of the given image.

Figure 3A:
FIGS. 3A-3H and 4A-4D illustrate spatial domain representations and time-frequency representations of images, according to various embodiments.

FIGS. 3A-3H and 4A-4D illustrate representations of images in the spatial domain and in the frequency domain generated as part of a wavelet transform, according to various embodiments. For example, FIG. 3A illustrates an input image (i.e. an image in the spatial domain) for which frequency content is to be computed. In this example, the input image is to be divided into 3 spectral slices, i.e. the frequency content is to be computed for three frequency bands:

A high-frequency band ($\pi/2$-$\pi$)
A mid-range frequency band ($\pi/4$-$\pi/2$)
A low-frequency band (0-$\pi/4$)

As described above, frequencies may be measured horizontally and/or vertically. It is the nature of most MRA techniques, including DWT, to equally weight the horizontal and vertical directions. The output of DWT is a time-frequency representation (TFR) composed of sub-images (e.g., for different frequency ranges and/or directional frequencies) that when displayed may look like different versions of the original image. The directional frequencies are generated as part of the computation of the TFR. Examples of sub-images representing these directional frequencies are illustrated in FIGS. 3A-3G for purposes of understanding, although they may not be used by the image editing application in implementing modifications to the frequency content of an image.

Figure 3B:
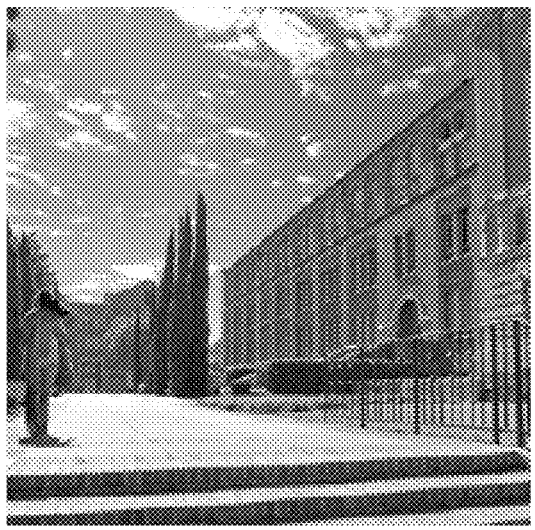

In the examples illustrated in FIGS. 3B-3H and 4B-4D, various sub-images are illustrated that have been computed using a heavier weighting on the vertical or horizontal frequencies, or using an equal weighting between the two. For example, FIG. 3B illustrates a graphical representation of the frequency content of the input image of FIG. 3A in the first frequency band (i.e. a sub-image of the TFR for the low-frequency band). In this example, this sub-image reflects the equal weighting of the horizontal and vertical directions. As described above, each pixel value in this sub-image may correspond to a normalized value of the frequency content at that pixel for the associated frequency band. For example, a white pixel in FIG. 3B may represent an image pixel associated with a frequency content value of 100 (i.e. a maximum value) in the low-frequency band, a black pixel in FIG. 3B may represent an image pixel associated with a frequency content value of 0, and pixels of various intensities between white and black may represent image pixels associated with frequency content values between 0 and 100.

Figure 3C:
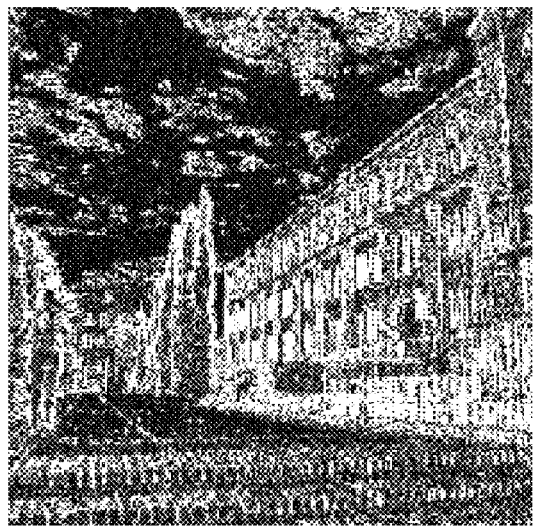
Figure 3D:
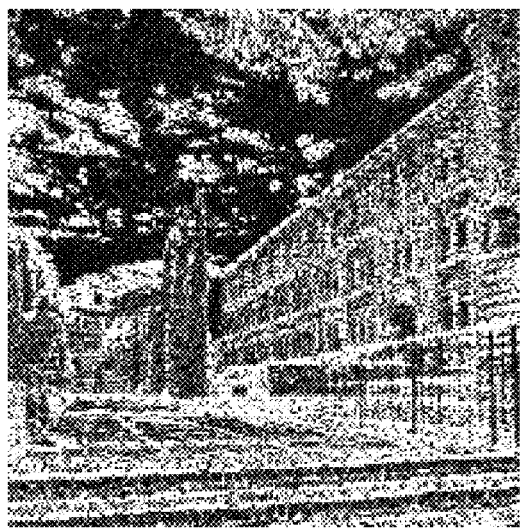
Figure 3E:
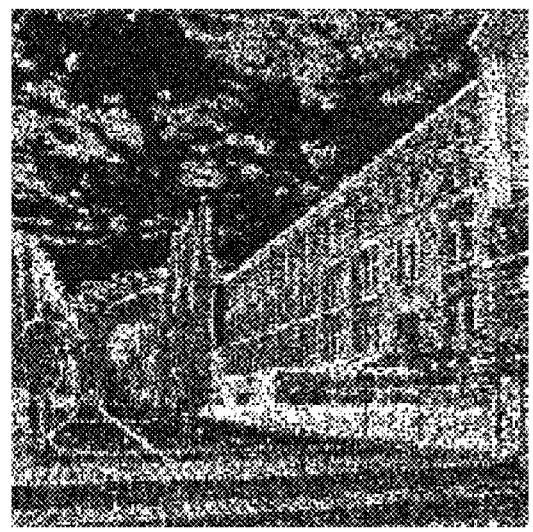
Figure 3F:
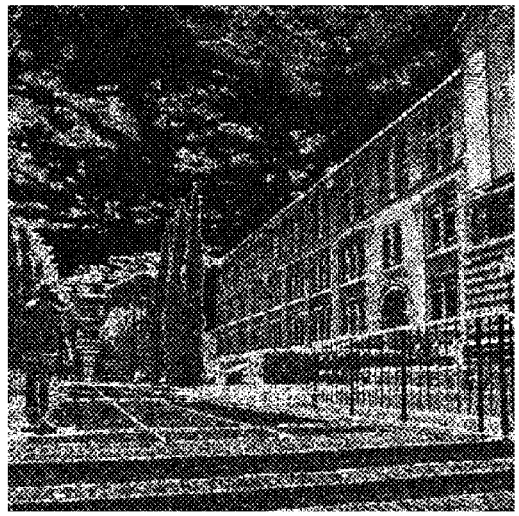
Figure 3G:
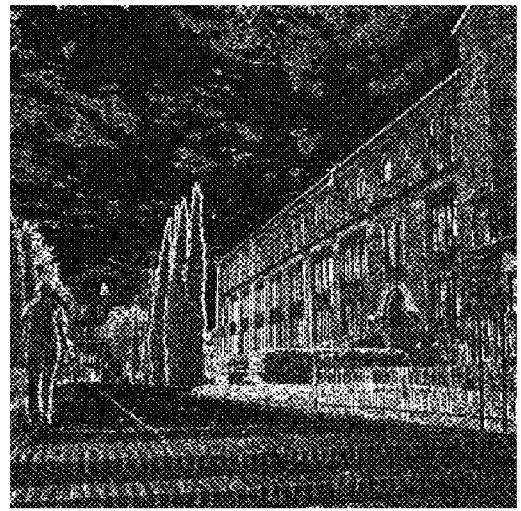
Figure 3H:
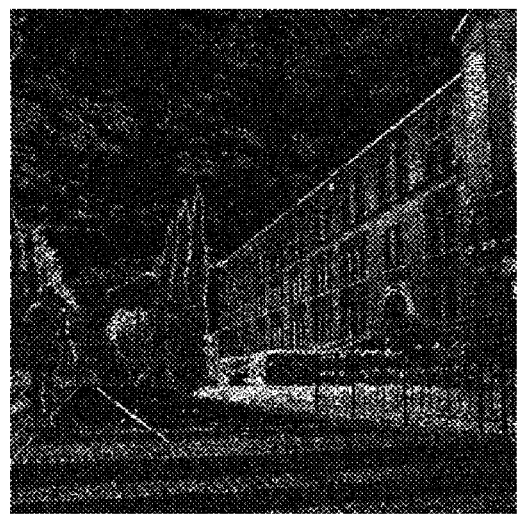

In this example, FIGS. 3C-3E illustrate graphical representations of sub-images of the TFR representing the frequency content of the input image of FIG. 3A in the second frequency band (i.e. the mid-range frequency band). In this example, FIG. 3C represents a sub-image in which the horizontal direction is the preferred direction, FIG. 3D represents a sub-image in which the vertical direction is the preferred direction, and FIG. 3E represents a sub-image in which the horizontal and vertical directions are equally weighted. Similarly, FIGS. 3F-3H illustrate graphical representations of sub-images of the TFR representing the frequency content of the input image of FIG. 3A in the third frequency band (i.e. the high-frequency band). In this example, FIG. 3F represents a sub-image in which the horizontal direction is the preferred direction, FIG. 3G represents a sub-image in which the vertical direction is the preferred direction, and FIG. 3H represents a sub-image in the horizontal and vertical directions are equally weighted. In each of these sub-images, as in FIG. 3B described above, the pixel values (colors) may reflect the frequency content value at the corresponding input image pixel for the particular frequency band, as computed by the transform.

Figure 4A:
Figure 4B:
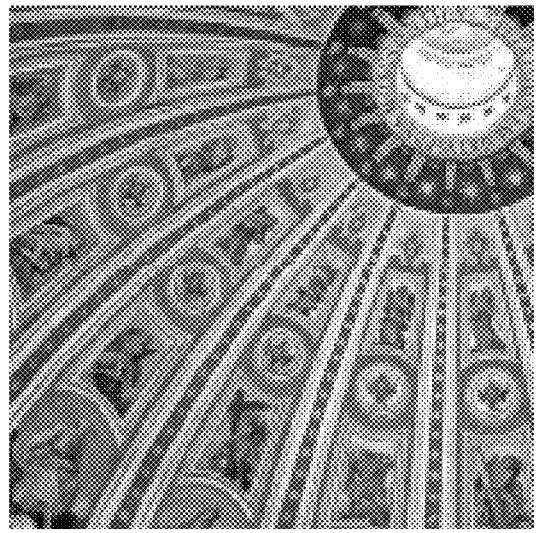
Figure 4C:
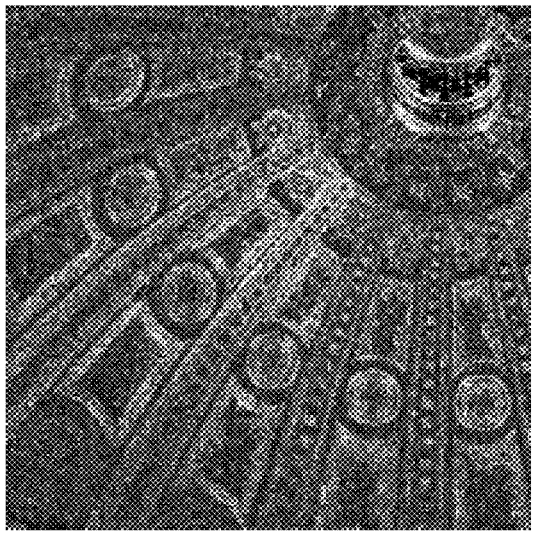
Figure 4D:

In another example, FIG. 4A illustrates a second input image for which the frequency content is to be computed. In this example, the input image is to be divided into the same 3 spectral slices as those described above with respect to FIGS. 3A-3H. In this example, FIG. 4B illustrates a graphical representation of a sub-image of a TFR representing the frequency content of the input image of FIG. 4A in the first frequency band (i.e. the low-frequency band), generated as described herein. In this example, FIG. 4C illustrates a graphical representation of a sub-image of the TFR representing of the frequency content of the input image of FIG. 4A in the second frequency band (i.e. the mid-range frequency band), and FIG. 4D illustrates a graphical representations of a sub-image of the TFR representing the frequency content of the input image of FIG. 4A in the third frequency band (i.e. the high-frequency band). In each of these sub-images, as in FIG. 3B described above, the pixel values (colors) may reflect the frequency content value at the corresponding input image pixel for the particular frequency band as computed by the transform. Note that in this example, there is very little additional information found in the high-frequency sub-image of the TFR, as compared to the sub-images for the low-frequency and mid-range frequency bands.

As previously noted, in some embodiments, rather than (or in addition to) providing a graphical image representation of the frequency content of an image generated by DWT, the system may provide a tool for numerically displaying the frequency content of an image at a particular location in the image. For example, an image editing application supporting examination and editing of frequency content may utilize a selection tool (e.g., an "eye dropper" tool) with which a user may select a particular pixel of an image. In response to this selection, the image editing application may be configured to display a numerical representation of the frequency content of the image at that pixel. For example, a tuple may be displayed in which each element corresponds to the frequency content in a given frequency band, as described above. In such embodiments, as various pixels are selected by the user, the display of these values may provide insight into the frequency content of the image in a way that is intuitive for the user to comprehend. For example, if there is a region of an image in which the user wants to a amplify a particular frequency range (but does not know exactly which slice to pick), these tools may be used to examine the local frequency content to determine the appropriate frequency band for which the content should be amplified. In such embodiments, a frequency content editor may then be applied to accomplish the desired amplification.

After viewing a representation of the frequency content of an image (e.g., either as one or more sub-images of a TFR or as a collection of numerical values for one or more selected pixels), a user may determine that an attempt to modify the frequency content of the image may result in a more desirable result (e.g., by sharpening, blurring, or applying an artistic filtering operation on the image). In some embodiments, the system described herein may provide mechanisms for a user to specify and invoke modifications of the frequency content directly, e.g., using various input mechanisms of a GUI. In some embodiments, such modifications may be applied globally, i.e. to the entire image. In other embodiments, such modifications may be applied locally, i.e. within a pre-defined radius of influence surrounding a selected pixel. In some embodiments, the frequency content examination mechanisms and frequency content editing mechanisms may provide a seamless workflow for a user to intelligently and intuitively modify the frequency content of an image. For example, these mechanisms may in some embodiments provide a way to design a custom band-pass filter.

In different embodiments, a graphics application (e.g., an image editing application or another graphics application that includes image editing functionality) may provide various input mechanisms with which the user may indicate selections and/or input values for various parameters of image editing operations, including frequency content editing operations. FIGS. 5A-5E illustrate a graphical user interface of a graphics application configured to provide functionality for generating and displaying frequency content information and/or editing the frequency content of images, according to various embodiments. As shown in this example, the graphical user interface (GUI), may present selection tools, slider bars, pop-up menus, pull-down menus, dials, alphanumeric text entry boxes, or other mechanisms for identifying image editing operations to be invoked and/or for specifying values or relative values of various configurable parameters. For example, FIGS. 5A-5E illustrate a GUI of an image editing application (or an image editing module of another graphics application) that may provide mechanisms for a user to apply the frequency content examination and frequency content editing techniques described herein and to adjust one or more parameters of these operations, according to one embodiment. In this example, an image editing module may provide a selection tool and one or more user interface elements whereby a user may select and control the application of the frequency content examination and frequency content editing techniques described herein, including generation of a time-frequency representation of an image. The user interface may also provide user interface elements for controlling various aspects of other image editing operations and/or for performing other image editing tasks. The user interface illustrated in FIGS. 5A-5E is provided as an example of one possible implementation, and is not intended to be limiting.

Figure 5A:
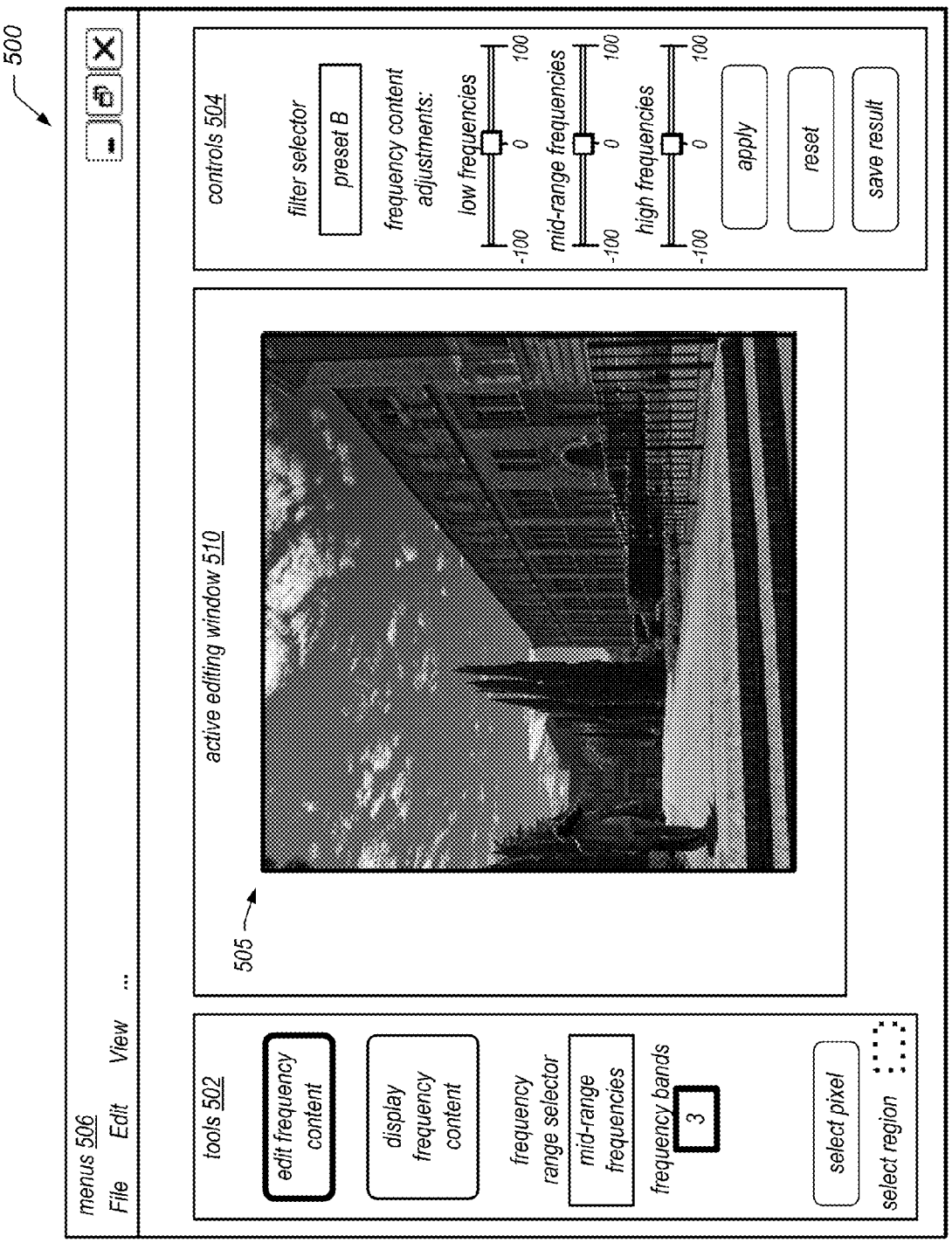
FIGS. 5A-5E illustrate a graphical user interface of a graphics application that includes frequency content editing capability, according to some embodiments.

FIG. 5A illustrates an example display 500 depicting various frames that may be visible to a user during an image editing operation. In this example, the display is divided into four regions or areas: menus 506, tools 502, controls 504, and active editing window 510. In this example, an input image 505, on which various image editing operations (including frequency content editing operations) are to be applied, is displayed in active editing window 510. As shown in FIG. 5A, tools area 502 may include one or more user-selectable user interface elements. In this example, it is this area that contains the user interface elements that a user may select to apply various operations (e.g., editing frequency content, generating a time-frequency representation of an image, displaying/examining frequency content, or selecting a region on which to operate) when editing an image.

As shown in the example illustrated in FIG. 5A, the user may select an operation to invoke a frequency content editing operation, or to enter a frequency content editing mode (e.g., "edit frequency content"). In some embodiments, selection of an operation to "edit frequency content" may invoke the generation of a time-frequency representation for use in a subsequent operation (e.g., displaying an indication of the frequency content or modifying the frequency content of an input image). In response to the user selecting "edit frequency content" in tools area 502, the image editing application may be configured to generate a time-frequency representation of the image for a given number of frequency bands, as described above, if that data does not already exist. For example, FIG. 5A illustrates the selection of an "edit frequency content" operation (shown in FIG. 5A by the bold boundary around the item "edit frequency content"), with 3 frequency bands (shown in FIG. 5A by the selection of "3" in the frequency band selection box surrounded by the bold boundary in tools area 502). In response to these selections, the image editing application may be configured to enter a frequency content editing mode, to generate a time-frequency representation of the image, and to store frequency content information for the input image in a low-frequency band, a mid-range frequency band, and a high-frequency band, as described herein.

Figure 5B:
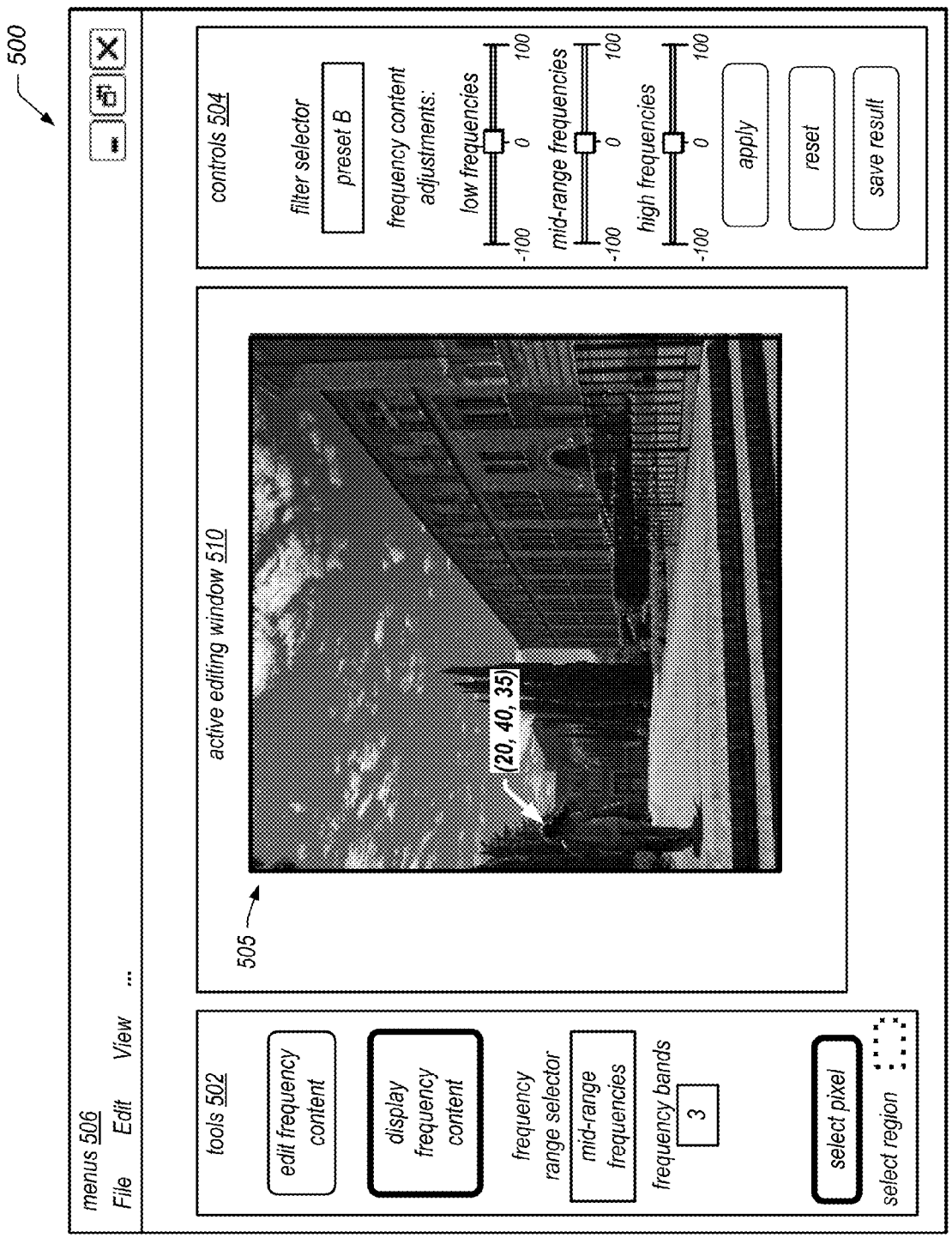

The system and methods described herein may in some embodiments provide mechanisms to allow the frequency content of an image to be examined and/or edited by a user in a way that is intuitive for the user. For example, FIG. 5B illustrates the display of frequency content information associated with a given pixel of an input image for which a time-frequency representation has been generated. In this example, if the user selects an operation to display the frequency content of an image (shown in FIG. 5B by the bold boundary around the "display frequency content" element in tools area 502), and the user chooses a pixel selection tool (shown in FIG. 5B by the bold boundary around the "select pixel" element in tools area 502), the image editing application may be configured to display frequency content data associated with various pixels of the input image as the user moves a cursor or "eye dropper" tool to hover over different pixels of the input image. This is shown in FIG. 5B as the display of a tuple having the values (20, 40, 35) while the cursor points to a particular pixel of input image 505 in active editing window 510. As previously noted, the frequency content information to be displayed may in various embodiments be obtained from a table or other data structure in which it has been stored, or may be calculated on an as-needed basis in response to invocation of a frequency editing operation or entering a frequency editing mode.

In this example, the value of each element of the displayed tuple may correspond to the frequency content at the identified pixel in a corresponding one of three frequency ranges (e.g., a low-frequency band, a mid-range frequency band, and a high-frequency band, respectively). In some embodiments, as the user moves the cursor or eye dropper tool over input image 505, data representing frequency content may be displayed for each pixel that the cursor or eye dropper tool passes over. In embodiments in which data representing the frequency content of the image has been generated for a different number of frequency bands, the image editing application may be configured to display a different number of data elements for each pixel, i.e. one for each frequency band for which such data has been computed. In other embodiments, rather than displaying numerical values representing the frequency content of input image 505 in different bands (e.g., a string of numbers), the image editing application may be configured to display frequency content information in another form, e.g., using histograms to represent the frequency content in each frequency band (with each "bucket" representing a respective frequency band), bar charts, or any other suitable representation of the frequency content in the respective frequency bands.

Figure 5C:
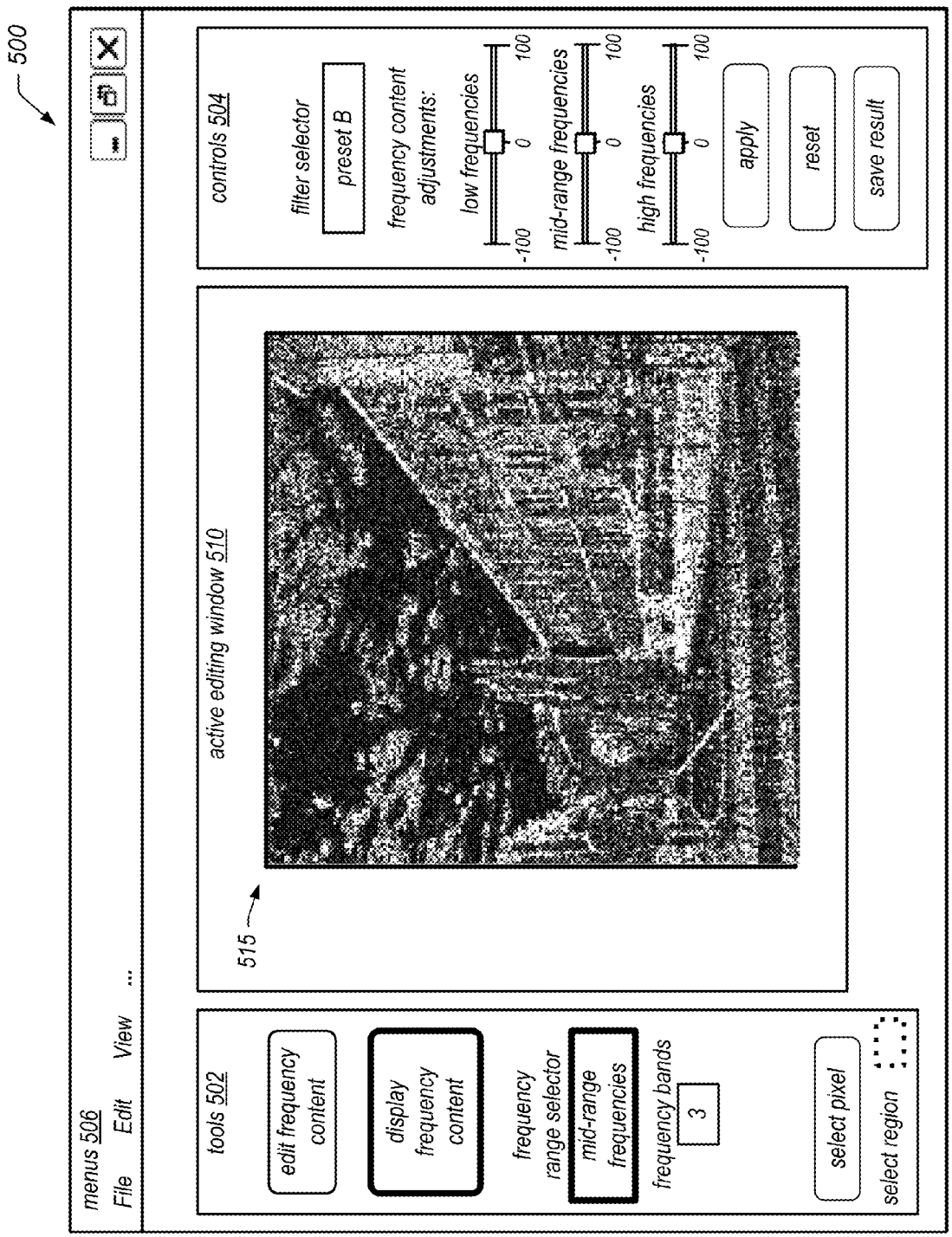

In some embodiments, an image editing application may be configured to display a graphical representation of the frequency content information generated for a given input image. In such embodiments, a user may elect to display a graphical representation of the low-frequency, mid-range frequency, or high-frequency content of the overall image before performing a detailed examination of the frequency content (e.g., at one or more pixels) and/or applying any frequency content editing operations. For example, FIG. 5C illustrates the selection of an operation to display the frequency content of the image (shown in FIG. 5C by the bold boundary around the "display frequency content" element in tools area 502), and the selection of the mid-range frequency band (shown in FIG. 5C by the selection of "mid-range frequencies" in the frequency selector box surrounded by a bold boundary in tools area 502). In this example, in response to these selections, the image editing application is configured to display a graphical image 515 in active editing window 510 representing the frequency content of input image 505 in the mid-range frequency. This graphical image is similar to that illustrated in FIG. 3E, and may represent a sub-image of the TFR reflecting the frequency content in the mid-range frequency band. As described above, in some embodiments, the pixel values (colors) depicted in graphical image 515 may reflect the frequency content values at the corresponding pixels in input image 505 for the particular frequency band specified for the current display operation. As in the previous example, the frequency content information to be displayed may in various embodiments be obtained from a table or other data structure in which it has been stored, or may be calculated on an as-needed basis in response to invocation of a frequency editing operation or entering a frequency editing mode.

Figure 5D:
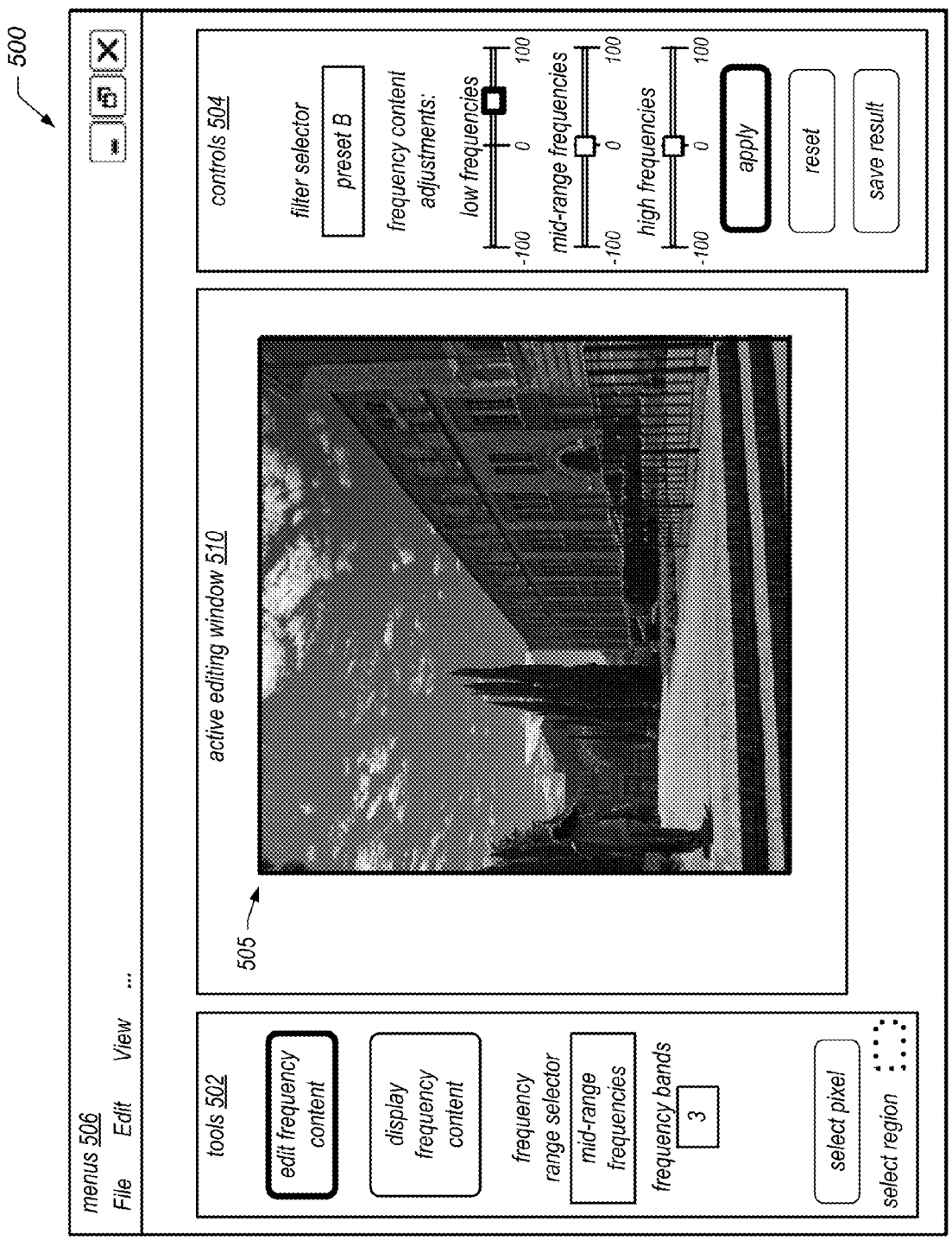
Figure 5E:
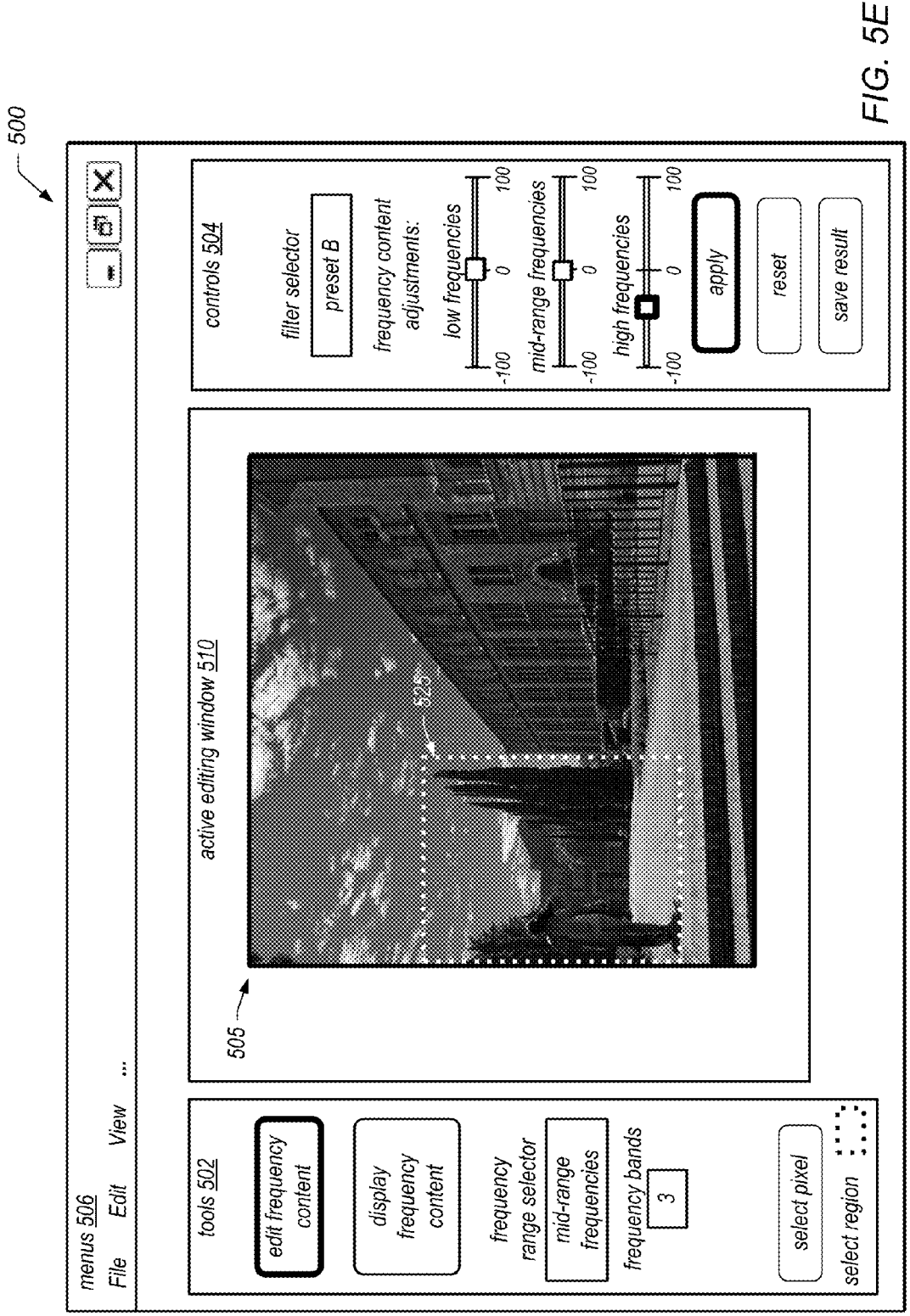

The system and methods described herein may in some embodiments provide intuitive mechanisms to edit the frequency content of an input image. For example, the system may provide a user interface that is reminiscent of an audio mixing interface (e.g., a graphic equalizer) to modify the frequency characteristics of an image, e.g., to attenuate and/or amplify the frequency content of the image in different frequency bands, much like boosting the treble or lowering the bass response in an audio signal. In one such embodiment, the interface may include a slider bar for each frequency band. The slider bars may initially be centered at zero (as illustrated in these examples), or at a value corresponding to the frequency content at a particular location (e.g., a selected pixel), in different embodiments, and may be adjusted by the user from that point. FIGS. 5D and 5E illustrate examples of the use of such an interface, according to one embodiment. FIG. 5D illustrates the use of slider bars in controls area 504 to modify the low frequency content of the input image. For example, in response to examining the frequency content of input image 505 (as shown in FIG. 5B and/or FIG. 5C), the user may wish to amplify the low-frequency content of image 505. As shown in this example, the user may in some embodiments be able to select an operation to edit the frequency content of image 505 (e.g., "edit frequency content" in tools area 502). In this example, if the user selects an operation to edit the frequency content of image 505 (shown in FIG. 5D by the bold boundary around the item "edit frequency content"), the user may be able to edit the frequency content according to one or more parameters specified by the user using one or more input mechanisms included in controls area 504.

As illustrated in FIGS. 5A-5E, controls 504 may include one or more user-modifiable controls, such as slider bars, dials, pop-up menus, alphanumeric text entry boxes, check boxes, etc., for specifying various parameters of an image editing operation that is to be applied to a input image. As shown in this example, controls area 504 may include slider bars for use in modifying the frequency content in each of the frequency bands for which the frequency content of image 505 has been computed (i.e. for low frequencies, mid-range frequencies, and high frequencies, in this example). In the example illustrated in FIG. 5D, the user has indicated a desired change in the low frequency characteristics of image 505 (an amplification of the low frequency content) by changing the position of the corresponding slider bar, moving it to the right. By selecting the "apply" button in controls area 504, the user may invoke the application of this change to the data representing image 505. In some embodiments, the image editing application may be configured to display the results of such a modification (i.e. to display a modified image) in active editing window 510 (not shown). In some embodiments, the initial position of each slider bar (prior to the application of a frequency content editing operation) may be set to zero (i.e. a center value), while in other embodiments, each slider may be set to a position corresponding to a frequency content value for a respective frequency band at a selected pixel. In other embodiments, a desired modification of the frequency content of an image in a particular frequency band may be specified using a pull-down menu, a radio button, or another type of input mechanism other than a slider bar in controls area 504.

In some embodiments, if the user selects one of the operations invoked through the mechanisms in tools area 502, the user may be prompted to select a portion of the input image 505 being edited in active editing window 510 on which to apply the operation. As shown the example illustrated in FIG. 5E, the user may apply a selection tool of tools area 502 to identify a portion of the image on which to apply the selected operation. For example, the user may select a portion of image 505 by defining a window around the selection using the selection tool of tools area 502 (e.g., using a mouse, touch pad, keyboard, track ball, etc. to move a cursor across the timeline image to draw the bounding box). In some embodiments, the selected portion of the image may be displayed in active editing window 510 in response to its selection, or an indication of its selection (e.g., bounding box 525) may be displayed as if overlaid on image 505 in window 510. In this example, in response to selection of an operation to edit frequency content, such as those described above, the graphics application may be configured to apply the selected operation to the portion of image 505 identified by bounding box 525. In this example, the user has selected "edit frequency" from tools area 502 (shown in FIG. 5A by the bold boundary around "edit frequency"), has modified the position of the slider bar in controls area 504 for "high frequencies" (moving the slider bar to the left to indicate an attenuation of the high frequency content), and has selected "apply" from controls area 504 while a portion of image 505 is defined by bounding box 525. In response, the image editing application may be configured to apply a modification to the high-frequency content only in the portion of image 505 defined by bounding box 525, attenuating the frequency content in this frequency range. Note that in this example, although the user has selected a specific region in which to apply the modification, data representing the entire image may be used to compute the frequencies present in that region, as described herein.

Note that in some embodiments, the system (or the user) may define a collection of presets for common filters, each of which corresponds to a given set of slider values and/or slider value changes. For example, a Gaussian filter may be defined in which particular frequency bands are attenuated by predefined amounts. Invocation of this filter may cause the frequency content in those bands to be reduced by the predefined amounts. In some embodiments, in addition to providing a mechanism to apply custom filtering operations, such presets may replace the interfaces to existing spatial filters (e.g., blur, sharpen, etc.) in an image editing application. In various embodiments, preset filters may be invoked by selection of the "edit frequency" operation and the selection of one of these presets (e.g., "preset B" in the filter selector element in controls area 504). In some embodiments, the image editing application may include a standard user interface for common filtering operations (e.g., blur, sharpen), but the underlying code for implementing the changes to the frequency content may employ the Fourier transform rather than the less accurate spatial filtering approximation found in typical image editing applications.

In some embodiments, as a frequency content editing operation is applied to a highlighted image, the display of the image being edited may be refreshed to provide a preview of the results of the modification(s). In some embodiments, if the preview result is acceptable to the user, the user may elect to save the modified image. For example, in some embodiments, the user may select the "save result" element in controls area 504 of FIGS. 5A-5E. Conversely, if the preview result is not acceptable, the results may be discarded, e.g., by selection of the "reset" item in controls area 504. In some embodiments, invocation of a frequency content editing operation (e.g., by selection of the item "edit frequency content" in tools area 502) may cause a currently selected frequency content editing operation (e.g., preset filter operation, custom filter operation, or display operation) to be applied to the image displayed in active editing window 510. In some embodiments, if the frequency content information needed to apply the operation has not yet been computed, selection of the operation and/or the image on which is to be applied may trigger the generation of the applicable data, as described herein.

While FIGS. 5A-5E illustrate several of the elements in tools area 502 and 504 as radio buttons, text entry boxes, or slider bars, other types of user interface elements, such as pop-up menus, or pull-down menus, may be used to select from among one or more tools in various embodiments. In various embodiments, the reset tool illustrated in FIGS. 5A-5E may or may not be included in the user interface. Various embodiments may include other tools not shown, as well, such as an "undo" tool that undoes the most recent user action in active editing window 510. In various embodiments, controls area 504 may include other input mechanisms such as additional pull-down menus, pop-up menus, slider bars, or other mechanisms usable to specify values of other configurable parameters for image editing functions provided by the graphics application.

In some embodiments, various operations (such as those illustrated in FIGS. 5A-5E and described above) may produce an output file in the same folder as the input image, or an output file whose name and/or location are specified using the "File" element in menus area 506. In some embodiments, a user may be able to specify a file name or other location at which the results (e.g., frequency content information stored in tables or as sub-images of a time-frequency representation and/or output images) should be stored, using the "File" element of menu area 506, in this example.

In the example illustrated in FIGS. 5A-5E, menus 506 may include one or more menus, for example menus used to navigate to other displays in the image editing application, open files, display or save files, undo/redo actions, view one or more selected representations of an image, and so on. In some embodiments, an image file (e.g., an input or output file containing image data and metadata associated with an image) or a file containing data representing the results of DWT (e.g., a time-frequency representation) may be identified by the user through the "File" option in menu area 506. This menu item may include, for example, a user-selectable pull-down option for importing one or more images or data structures (e.g., lookup tables containing frequency content information) from an identified file and/or for specifying and name and/or location of an output file, as described above. In the example illustrated in FIGS. 5A-5E, active editing window 510 is the area in which an image being edited is displayed as various editing operations are performed. In various embodiments and at various times, active editing window 510 may display a portion of an input image to which an editing operation is to be applied, or a portion of a resulting (modified) image, an output image, or any intermediate image produced as part of the image editing operation, as described herein.

In the example illustrated in FIGS. 5A-5E, menu 506 includes a "view" option. This menu item may include, for example, a user-selectable pull-down or pop-up menu usable to select which of various representations of an image (e.g., an input image, a stored graphical representation of the frequency content of an image in a given frequency band, etc.) are displayed in active editing window 510, or in another area of display 500. In other embodiments, different input mechanisms may be provided for selecting a view to be displayed, such as one or more radio buttons, alphanumeric text boxes, dials, etc. In some embodiments, one of the available viewing options may be a "split view", in which two or more representations of an image may be simultaneously displayed (e.g., an input image and a corresponding preview image may be displayed while the user applies an image editing operation, including a frequency content editing operation). In some embodiments, as the user iteratively applies the techniques described herein, the system may be configured to automatically update and/or store the data representing the preliminary results of the operation. The system may also be configured to automatically refresh the image 505 and a preview image of a modified version of image 505 being displayed in response to these updates.

In some embodiments, a user may be prompted to provide one or more of the inputs described above in response to invoking an operation of the graphics application. In other embodiments, the graphics application may provide default values, application-specific values, and/or operation-specific values for any or all of these inputs. In some embodiments, the user may be allowed to override one or more default parameter values using an interface similar to that illustrated in FIGS. 5A-5E.

Some embodiments of the system described herein may include a means for generating frequency content information for a given image. For example, a wavelet transform module may compute the frequency content of a given image in a plurality of frequency bands (e.g., a time-frequency representation of the image), and may store data representing the frequency content of the image for later use, as described in detail herein. The wavelet transform module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform computing the frequency content of a given image in a plurality of frequency bands, and storing data representing the frequency content of the image for later use, as described in detail herein. Other embodiments of the wavelet transform module may be at least partially implemented by hardware circuitry and/or firmware stored, for example, in a non-volatile memory.

In other embodiments, the means for generating frequency content information for a given image may comprise a Fourier transform module, which may compute the frequency content of a given image and may store data representing the frequency content of the image for later use, as described in detail herein. The Fourier transform module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform computing the frequency content of a given image and storing data representing the frequency content of the image for later use, as described in detail herein. Other embodiments of the Fourier transform module may be at least partially implemented by hardware circuitry and/or firmware stored, for example, in a non-volatile memory.

Some embodiments of the system described herein may include a means for generating a modified image in the spatial domain from a frequency domain representation of the modified image. For example, an inverse Fourier transform module may generate image data from frequency content data on which a frequency content editing operation has been applied, and may store data representing the modified image for later use, as described in detail herein. The inverse Fourier transform module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform generating image data from frequency content data on which a frequency content editing operation has been applied, and storing data representing the modified image for later use, as described in detail herein. Other embodiments of the inverse Fourier transform module may be at least partially implemented by hardware circuitry and/or firmware stored, for example, in a non-volatile memory.

Some embodiments of the system described herein may include a means for modifying the frequency content of an input image. For example, a frequency content editing module may receive input indicating a frequency content editing operation to be applied to an input image, may perform the frequency content editing operation on data representing the frequency content of the input image, and may store the modified data for later use, as described in detail herein. The frequency content editing module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform receiving input indicating a frequency content editing operation to be applied to an input image, performing the frequency content editing operation on data representing the frequency content of the input image, and storing the modified data for later use, as described in detail herein. Other embodiments of the frequency content editing module may be at least partially implemented by hardware circuitry and/or firmware stored, for example, in a non-volatile memory.

Some embodiments of the system described herein may include a means for displaying the frequency content of an image. For example, a frequency content display module may display a numerical or graphical indication of the frequency content of an image, as described in detail herein. The frequency content display module may in some embodiments be implemented by a computer-readable storage medium and one or more processors (e.g., CPUs and/or GPUs) of a computing apparatus. The computer-readable storage medium may store program instructions executable by the one or more processors to cause the computing apparatus to perform displaying a numerical or graphical indication of the frequency content of an image, as described in detail herein. Other embodiments of the frequency content display module may be at least partially implemented by hardware circuitry and/or firmware stored, for example, in a non-volatile memory.

Figure 6:
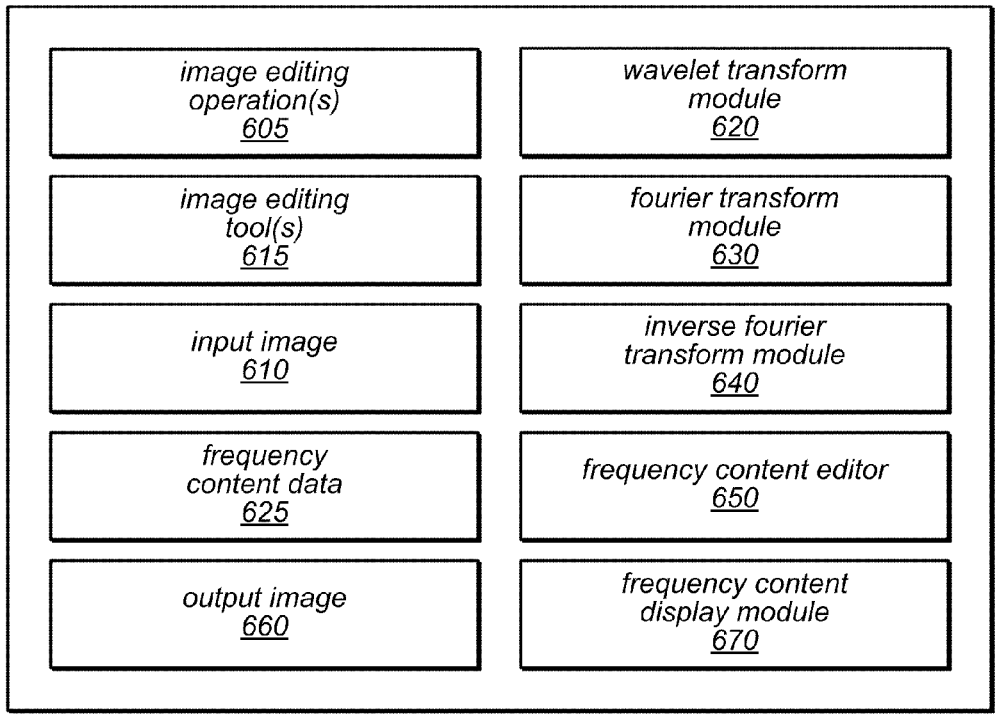
FIG. 6 is a block diagram illustrating an embodiment of a digital image editing program configured for frequency content editing.

FIG. 6 is a block diagram illustrating an embodiment of a digital image editing application (or an image editing application of a graphics application) configured for generating a time-frequency representation of an image, displaying an indication of the frequency content of an image, and/or editing the frequency content of an image, as described herein. In this example, digital image editing program 600 may comprise one or more image editing operations 605 and may provide one or more image editing tools 615. In one embodiment, a suitable product such as Adobe Photoshop®, Adobe Illustrator®, or Adobe AfterEffects® (all available from Adobe Systems, Inc.) may be used as the image editing program 600. The image editing program 600 may be used to create and/or modify a digital image 610. The image editing operations 605 and/or image editing tools 615 may comprise suitable operations for modifying pixels and/or geometric objects of the image 610. For example, various filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to images (including selections within an image) using image editing program 600. In addition, various frequency content editing operations may be applied to an image using image editing program 600. As illustrated in FIG. 6, in some embodiments, image editing program 600 may be configured to access, generate, store, and/or operate on one or more images 610 or on frequency content data 625, and may be configured to generate and/or store one or more output images 660 as a result of various image editing operations and/or frequency content editing operations.

As illustrated in FIG. 6, image editing program 600 may include a wavelet transform module 620, a Fourier transform module 630, an inverse Fourier transform module 640, a frequency content editor 650, and/or a frequency content display module 670. In various embodiments, these modules may be coded as an intrinsic part of the image editor 600 or as a plug-in module or other extension to the image editor 600. The image editing program 600 and its constituent elements and data may in some embodiments be stored in a memory of a computer system, shown as graphics application 920 in FIG. 8.

As described herein, a wavelet transform module 620 may be configured to automatically generate a time-frequency representation of an image 610, dependent on a default or user-specified number of frequency bands, in various embodiments. The time-frequency representation generated by wavelet transform module 620 may be stored as part of frequency content data 625, in this example. In some embodiments, a frequency content display module 670 may be configured to display a numerical or graphical indication of the frequency content of an image, as described herein. For example, in response to invocation of a frequency content display operation, a frequency content display module may be configured to access frequency content data 625 and to generate and present a numerical or graphical depiction of at least a portion of the data (e.g., numerical data representing the frequency content for a given pixel of input image 610, or graphical data representing the frequency content of input image 610 in a given frequency band, such as a sub-image of the TFR).

As described herein, a Fourier transform module 630 may be configured to compute a Fourier transform on data representing an input image 610 to generate data representing the frequency content input image 610, which may in some embodiments be stored as part of frequency content data 625.

In some embodiments, a desired modification of the frequency content of input image 610 may be implemented on the data generated by Fourier transform module 630 in response to the invocation of a frequency content editing operation of frequency content editor 650. For example, in response to invocation of an operation of frequency content editor 650 to amplify the low-frequency content of input image 610, frequency content editor 650 may access the frequency content data generated by Fourier transform module 630, and modify the frequency content data generated by Fourier transform module 630 to amplify the low-frequency content. In some embodiments, a modified image exhibiting this change (e.g., output image 660) may be generated by inverse Fourier transform module 640, which may operate on the modified frequency content data to produce output image 660. Output image 660 may in some embodiments be displayed to a user as a preview image. In various embodiments, output image 660 may be stored by image editing program 600 for subsequent display and/or further processing.

In various embodiments, frequency content editor 650, or another module of image editing program 600, may provide an interface through which a user may invoke various image editing tools 615 (e.g., a pixel selection tool or a region selection tool), and/or an interface through which a user may apply various image editing operations 605 (e.g., image resizing, resetting an image to discard preview results of an image editing exercise, or saving results of an image editing exercise).

Figure 7:
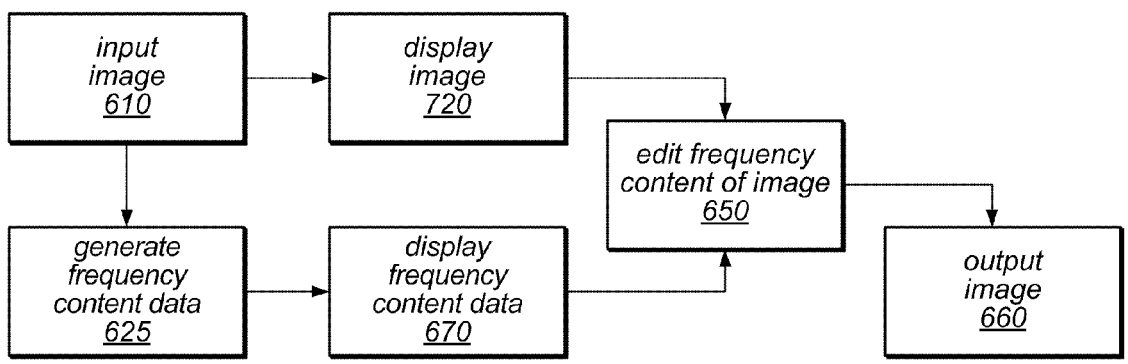
FIG. 7 illustrates a workflow associated with time-frequency representations of images and modification of frequency content of images, according to various embodiments.

FIG. 7 illustrates a workflow associated with examination and editing of frequency content data, according to one embodiment. As illustrated in FIG. 7, output image 660 may be generated, at least in part, based on input image 610. In this example, input image 610 may be displayed by one of various tools of image editing program 600 (e.g. a GUI such as that illustrated in FIGS. 5A-5E), as shown in 720 of FIG. 7. As illustrated in FIG. 7, frequency content data 625 (which may include a time-frequency representation of the image) may be generated for image 610, such as by a wavelet transform module 620 and/or Fourier transform module 630. In some embodiments, an indication of at least a portion of frequency content data 625 may be displayed, e.g., using frequency content display module 670.

As shown in this example, input image 610 may be modified (e.g., by frequency content editor 650) to produce output image 660. For example, in some embodiments, in response to the invocation of a frequency content editing operation, frequency content editor 650 may be configured to access frequency content data 625, to modify frequency content data 625 in accordance with the specified frequency content editing operation, and to produce output image 660 (e.g., by application of an inverse transform operation, such as an operation of inverse Fourier transform module 640).

Figure 8:
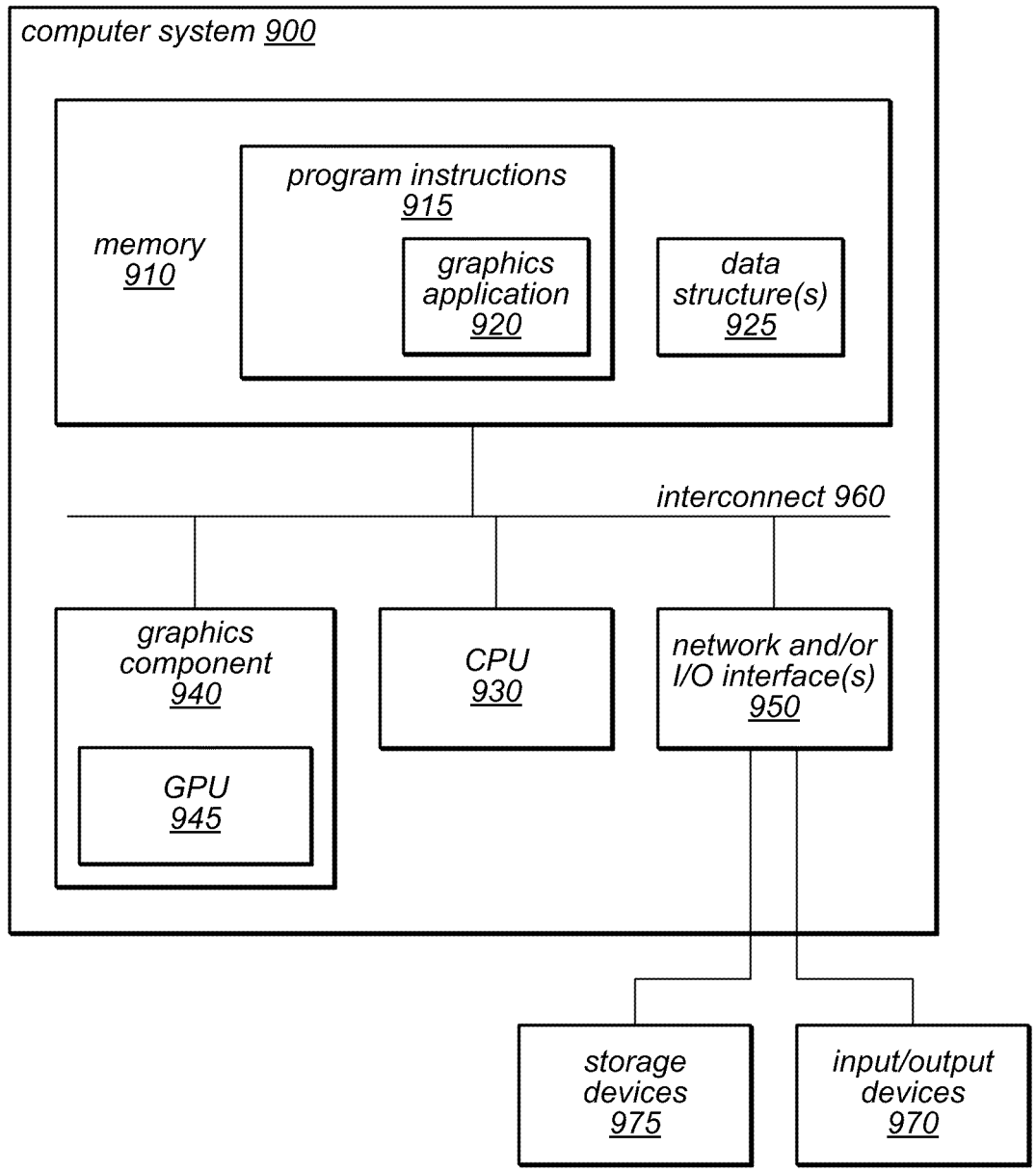
FIG. 8 illustrates a computer system configured to implement editing frequency content of images, according to one embodiment.

The methods described herein for examining and/or modifying the frequency content of an image may be implemented by a computer system configured to provide the functionality described. FIG. 8 is a block diagram illustrating constituent elements of a computer system 900 that is configured to implement embodiments of the systems and methods described herein, according to one embodiment. Computer system 900 may be one of any of various types of devices, including, but not limited to, a personal computer system, desktop computer, laptop, notebook or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device. As illustrated in FIG. 8, computer system 900 may in various embodiments include memory 910, a graphics component 940, one or more processor units (CPUs) 930, and one or more network and/or input/output interfaces 950. The illustrated components, including processor(s) 930, system memory 910, and others, may be coupled to each other by at least one communications bus, shown as interconnect 960 (e.g., a system bus, LDT, PCI, ISA, or other communication bus type), and/or by interface 950 (e.g., an ATM interface, an Ethernet interface, a Frame Relay interface, or other network interface). The CPU 930, the interface 950, and the memory 910 may be coupled to the interconnect 960. It should also be noted that one or more components of system 900 might be located remotely and accessed via a network, in some embodiments.

Processors 930 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 900, such as various versions of Unix, Linux, Windows® from Microsoft Corporation, MacOS® from Apple Corporation, or any other operating system that enables the operation of software on a hardware platform.

System memory 910 may include one or more of cache, SRAM, DRAM, RDRAM, EDO RAM, DDR RAM, SDRAM, Rambus RAM, EEPROM, or other memory type), or other types of RAM or ROM. Memory 910 may include other types of memory as well, or combinations thereof. One or more of memories 910 may include program instructions 915 executable by one or more of processors 930 to implement aspects of the frequency content examination and frequency content editing techniques and/or image processing operations described herein. Program instructions 915, which may include program instructions configured to implement graphics application 920, may be partly or fully resident within the memory 910 of computer system 900 at any point in time. Alternatively, program instructions 915 may be provided to CPU 930 and/or GPU 945 for performing frequency content examination and frequency content editing techniques and/or image processing operations (or portions thereof) on CPU 930 and/or GPU 945 using one or more of the techniques described herein. In some embodiments, the techniques described herein may be implemented by a combination of program instructions 915 executed on one or more processors 930 and one or more GPUs 945, respectively. Program instructions 915 may also be stored on an external storage device 975 accessible by the processor(s) 930 and/or GPU 945, in some embodiments. Any of a variety of such storage devices may be used to store the program instructions 915 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 930 and/or GPU 945 through one or more interfaces including, but not limited to, interconnect 960 or interface 950, as described herein. In some embodiments, the program instructions 915 may be provided to the computer system 900 via any suitable computer-readable storage medium including memory 910 and/or external storage devices 975 described above. Memory 910 may also be configured to implement one or more data structures 925, such as one or more data structures configured to store data representing one or more input images, output images, or intermediate images (e.g., during processing of the images), or data representing the frequency content of an image (e.g., a lookup table, or image data corresponding to a graphical image of one or more sub-images of a time-frequency representation). Data structures 925 may be accessible by processor(s) 930 and/or GPU 945 when executing graphics application 920 or other program instructions 915.

As described herein, a graphics application such as graphics application 920 may be configured to perform automated generation of time-frequency representations and/or to provide functionality to facilitate frequency content examination and/or frequency content editing operations as part of various image processing functions and may render new images according to the functions performed. For example, graphics application 920 may perform frequency content editing operations to attenuate or amplify the frequency content in one or more frequency bands, according to various embodiments. In another example, graphics application 920 may perform various transformations of image data to produce time-frequency representations of images, in some embodiments. Graphics application 920 may be configured to render output images to a separate window, or directly into the same frame buffer containing the corresponding input images, in different embodiments. Graphics application 920 may represent various types of graphics applications, such as painting, publishing, photography, games, animation, and other applications. Additionally, graphics application 920 may utilize graphics processor 945 when processing, rendering, or displaying images according to various embodiments.

Graphics application 920 may be provided as a computer program product, or software, that may include a computer-readable storage medium having stored thereon instructions, which may be used to program a computer system (or other electronic devices) to implement the frequency content examination and frequency content editing techniques and/or image processing operations described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As noted above, in some embodiments, memory 910 may include program instructions 915, comprising program instructions configured to implement graphics application 920, as described herein. Graphics application 920 may be implemented in various embodiments using any desired programming language, scripting language, or combination of programming languages and/or scripting languages, e.g., C, C++, C#, Java™, Perl, etc. For example, in one embodiment, graphics application 920 may be JAVA based, while in another embodiments, it may be implemented using the C or C++ programming languages. In other embodiments, graphics application 920 may be implemented using specific graphic languages specifically for developing programs executed by specialized graphics hardware, such as GPU 945.

In addition, graphics application 920 may be embodied on memory specifically allocated for use by graphics processor(s) 945, such as memory on a graphics component 940 including graphics processor(s) 945. Thus, memory 910 may represent dedicated graphics memory as well as general-purpose system RAM, in various embodiments. Other information not described herein may be included in memory 910 and may be used to implement the methods described herein and/or other functionality of computer system 900.

Note that program instructions 915 may be configured to implement various modules described above (e.g., a wavelet transform module, a Fourier transform module, an inverse Fourier transform module, a frequency content editor and/or a frequency content display module) as stand-alone applications, or as modules of another graphics application or graphics library, in various embodiments. For example, in one embodiment program instructions 915 may be configured to implement graphics applications such as painting, publishing, photography, games, animation, and/or other applications, and may be configured to generate time-frequency representations and/or examine and edit frequency content as part of one or more of these graphics applications. In another embodiment, program instructions 915 may be configured to implement the techniques described herein in one or more functions called by another graphics application executed on GPU 940 and/or processor(s) 930. Program instructions 915 may also be configured to render images and present them on one or more displays as the output of an image processing operation and/or to store image data for processed images in memory 910 and/or an external storage device(s) 975, in various embodiments. For example, a graphics application 920 included in program instructions 915 may utilize GPU 940 when generating time-frequency representations, displaying frequency content, and/or editing frequency content and/or when rendering or displaying input images, output images, or various representations of the frequency content of images, in some embodiments.

As illustrated in FIG. 8, a specialized graphics card or other graphics component 940 may be coupled to the processor(s) 930. The graphics component 940 may include a graphics processing unit (GPU) 945. Additionally, the computer system 900 may include or be coupled to one or more imaging devices, such as input/output devices 970. The one or more imaging devices may include various types of raster-based imaging devices such as monitors and printers. In one embodiment, one or more display devices may be coupled to the graphics component 940 for display of data provided by the graphics component 940 (not shown).

A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 940 may implement a number of graphics primitive operations in a way that makes executing them much faster than drawing directly to the screen with a host central processing unit (CPU), such as CPU 930. In various embodiments, the methods described herein for examining and editing the frequency content of an image and/or processing an image may be implemented by program instructions configured for parallel execution on two or more such GPUs. The GPU 945 may implement one or more application programmer interfaces (APIs) that permit programmers to invoke the functionality of the GPU. Suitable GPUs may be commercially available from vendors such as NVIDIA Corporation, ATI Technologies, and others. In some embodiments, graphics component 940 may interface with the motherboard of computer system 900 by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 8, memory 910 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 940 and the rest of the computer system 900 may travel through a graphics card slot or other interface, such as interconnect 960 of FIG. 8.

Interface 950 may be configured to enable computer system 900 to communicate with other computers, systems or machines, such as across a network. A network interface 950 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 900 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 950 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 900 may also include one or more additional I/O interfaces 950, such as interfaces for one or more input/output devices 970, or such devices may be coupled to computer system 900 via a network interface 950. For example, computer system 900 may include interfaces to a keyboard, a mouse or other cursor control device, a joystick, or other user input devices 970, in various embodiments. Additionally, the computer system 900 may include one or more displays, coupled to processors 930 and/or other components via interconnect 960 or I/O interface 950. Such input/output devices may be configured to allow a user to interact with graphics application 920 to request various image processing operations (including frequency content editing operations) and/or to specify various parameters, thresholds, and/or other configurable options available to the user when processing images by executing graphic application 920. It will be apparent to those having ordinary skill in the art that computer system 900 may also include numerous other elements not shown in FIG. 8.

While various techniques for generating time-frequency representations, examining the frequency content of images, and editing the frequency content of images have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. For example, in various embodiments, the operations shown in FIGS. 1, and 2 may be performed in a different order than the illustrated order. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   a memory coupled to the one or more processors storing program instructions executable by the one or more processors to:
   produce frequency content data for an image based on a transformation of image data associated with the image;
   display a sub-image representative of frequency content of the image based on the frequency content data, the frequency content comprising a time-frequency representation at a specific frequency band;
   receive an input to modify the frequency content in a portion of the sub-image; and
   modify the frequency content in the portion of the sub-image based on the received input, the frequency content in the portion of the sub-image modified relative to the frequency content outside of the portion of the sub-image.

2. The system of claim 1, the program instructions further executable by the one or more processors to store the frequency content data in a data structure, and wherein the display of the sub-image comprises displaying at least a portion of the stored data.

3. The system of claim 1, wherein the transformation comprises to perform a wavelet transformation or to perform another multi-resolution analysis technique in which each sub-image generated by the transform represents a fixed, non-overlapping region of the frequency spectrum of the image.

4. The system of claim 1, the program instructions further executable by the one or more processors to:
   produce additional frequency content data based on an inverse transformation of the image data.

5. The system of claim 1, wherein the modification of the frequency content in the portion of the sub-image comprises an increase or decrease of the specific frequency band associated with the frequency content.

6. The system of claim 1, the program instructions further executable by the one or more processors to simultaneously display the image and the sub-image.

7. The system of claim 1,
   wherein the portion of the sub-image is a pixel of the image; and
   the program instructions are further executable by the one or more processors to display, in a user interface, a value corresponding to the frequency content of the pixel.

8. A method comprising:
   performing, by a computing device:
   accessing frequency content data of an image;
   displaying a sub-image indicating frequency content of the image based on the frequency content data, the frequency content comprising a time-frequency representation at a specific frequency band;
   receiving a selection of a portion of the sub-image;
   receiving an input to modify the frequency content in the selected portion of the sub-image; and
   modifying the frequency content in the selected portion of the sub-image based on the received input.

9. The method of claim 8, wherein the frequency content data is generated by performing a wavelet transformation or performing another multi-resolution analysis technique in which each sub-image generated by the transform represents a fixed, non-overlapping region of the frequency spectrum of the image.

10. The method of claim 8, further comprising:
    producing additional frequency content data based on a wavelet transform or an inverse transformation of the image data.

11. The method of claim 8, wherein the modification of the frequency content in the selected portion of the sub-image comprises increasing or decreasing the specific frequency band associated with the frequency content.

12. The method of claim 8, further comprising:
displaying the modified frequency content in the selected portion of the sub-image.

13. One or more computer readable storage memories encoded with instructions that, responsive to execution, direct a computing device to perform operations comprising:
displaying an image in a user interface;
receiving a selection to display, as a sub-image, frequency content associated with the displayed image, the received selection specifying a number of frequency bands in which to display the frequency content of the sub-image;
responsive to receiving the selection, transforming image data associated with the image to generate frequency content data for each of the specified frequency bands; and
displaying the sub-image indicative of the frequency content in at least one of the specified frequency bands based on the generated frequency content data.

14. The one or more computer readable storage memories of claim 13, wherein the user interface includes displayed controls that enable modifying one or more frequencies associated with the displayed sub-image.

15. The one or more computer readable storage memories of claim 13, wherein the user interface includes displayed tools that enable:
selection of a region of the image or the sub-image; and
selection of a pixel of the image or the sub-image.

16. The one or more computer readable storage memories of claim 13, the operations further comprising:
after the image data associated with the image is transformed, receiving a selection of a region of the image; and
displaying a new sub-image indicative of the frequency content for each of the specified frequency bands in the selected region.

17. The one or more computer readable storage memories of claim 13, the operations further comprising editing the frequency content of the displayed sub-image.

18. The one or more computer readable storage memories of claim 13, the operations further comprising defining a filter by attenuating one or more of the frequency bands by a pre-defined amount.

19. The one or more computer readable storage memories of claim 18, the operations further comprising at least one of:
applying the defined filter to the displayed sub-image; and
replacing one or more existing spatial filters in an image editing application with the defined filter.

20. The system of claim 1, wherein the modification of the frequency content in the portion of the sub-image comprises attenuating or amplifying a particular frequency band associated with the frequency content.

* * * * *